April 18, 1933. J. F. MALSBARY 1,904,743
STEAM DEFLECTOR AND GUARD FOR DAIRY SINKS
Filed Jan. 3, 1931
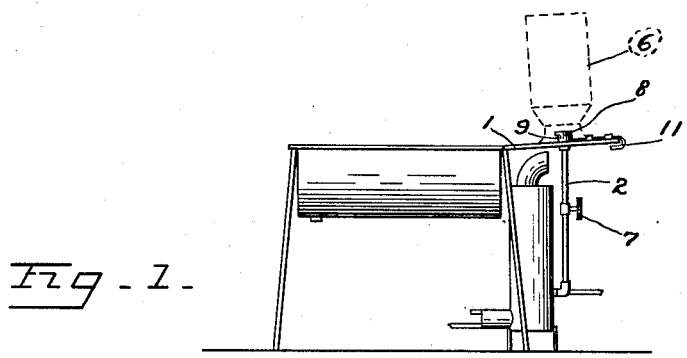
Fig-1-
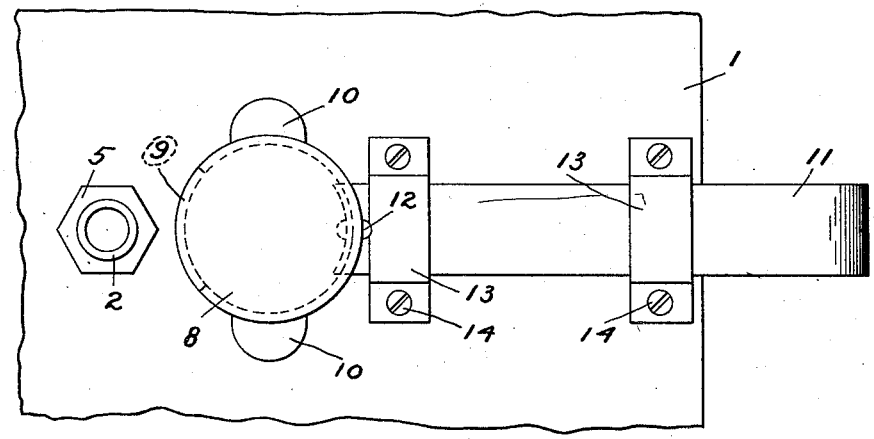
Fig-2-
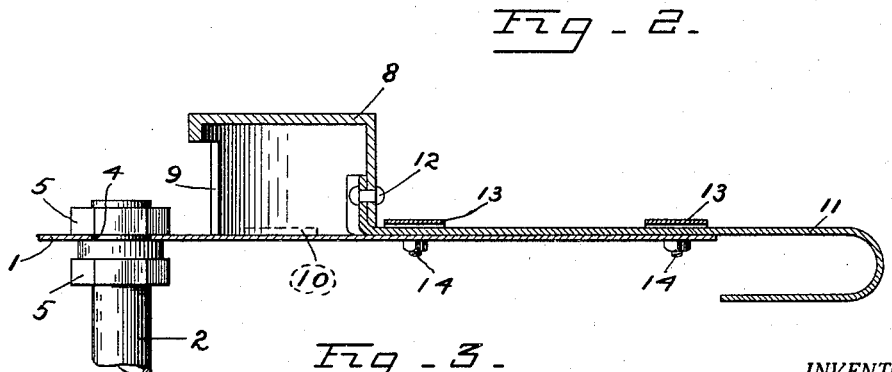
Fig-3-
INVENTOR.
JOB FORDYCE MALSBARY
BY Munn+Co.
ATTORNEYS.

Patented Apr. 18, 1933

1,904,743

UNITED STATES PATENT OFFICE

JOB FORDYCE MALSBARY, OF FRESNO, CALIFORNIA

STEAM DEFLECTOR AND GUARD FOR DAIRY SINKS

Application filed January 3, 1931. Serial No. 506,449.

My invention relates to improvements in steam deflectors and guards for dairy sinks, and it consists in the combinations, constructions and arrangements hereinafter described and claimed.

It is necessary to clean milk cans and other dairy equipment with live steam so as to thoroughly sterilize the parts. This live steam is apt to cause injury if it should strike a person, and I have therefore provided a novel steam deflector and guard to be used in connection with dairy sinks. The deflector and guard normally shields the open end of the steam pipe, and a handle is provided whereby the deflector and guard may be moved to uncover the pipe when the article to be cleaned, such as a milk can, already covers the pipe. After the sterilizing has been accomplished, the deflector and guard can be moved over the open end of the pipe, whereupon the milk can can be removed without endangering the operator with live steam.

A further object of my invention is to provide a device of the type described which is extremely simple in construction and which is durable and efficient for the purpose intended.

My invention is illustrated in the accompanying drawing, in which:

Figure 1 is a side elevation of the device shown operatively applied to a dairy sink, Figure 2 is a top plan view, and Figure 3 is a longitudinal section through the device.

In carrying out my invention I provide a dairy sink indicated generally at 1 and a pipe 2 (see Figure 3) carrying live steam which passes through an opening 4 in the sink and is secured in place by lock nuts 5 or other suitable fastening means. In practice, the milk can 6 or other article to be sterilized is inverted and placed above the outlet end of the pipe 2. The amount of steam issuing from the pipe 2 is controlled by a valve 7. The live steam escaping from the pipe 2 endangers the operator when the milk can 6 is removed.

In order to trap the steam and prevent it from forcing its way high above the sink 1, I provide an inverted cup-shaped member 8 (see Figure 3) that is slidable on the sink 1 and has an opening 9 for receiving the top of the pipe 2. Ears 10 extend laterally from the periphery of the cup 8 and act as supports.

The handle 11 is secured to the cup by a rivet 12 or other sutiable fastening means, and this handle is slidable in guides 13 which in turn are secured to the sink 1 by bolts 14.

From the foregoing description of the various parts of the device, the operation thereof may be readily understood.

The cup 8 normally covers the top of the pipe 2 as shown in Figure 1. Any live steam issuing from the top of the pipe is deflected downwardly by the top of the cup 8. Any steam condensing will flow from the cup in the form of a liquid and across the inclined sink 1. Of course, if a large quantity of steam is issuing from the pipe 2, a certain amount of this steam will pass from the opening 9, but the direction of the steam will have been changed by the cup 8, and this will minimize the danger.

The operator places a milk can 6 or other article over the pipe 2 and then removes the cup 8 from the pipe by means of the handle 11. The live steam will now pass into the inverted milk can and will thoroughly sterilize it. The operator can now move the handle 11 for again causing the cup 8 to cover the pipe 2. When this is done, the can 6 is removed without any danger of live steam harming the operator.

Although I have shown and described one embodiment of my invention, it is to be understood that the same is susceptible of various changes, as may come within the scope of the claims hereto annexed without departing from the spirit of the invention.

I claim:

1. The combination with a dairy sink having the open end of a steam conveying pipe terminating slightly above the plane of the sink, of a steam guard slidable on the sink and comprising an inverted cup-shaped member with an opening in its side wall for receiving the end of the pipe, a handle secured to the member and lying in the plane of the sink, and guides slidably securing the handle to the sink, said handle having a hand grip portion extending beyond the edge of the sink.

2. A steam guard comprising an inverted cup-shaped member having an opening in its side wall, supporting lugs extending from the rim of the cup, and a handle extending from said cup.

3. The combination with a steam pipe having an open end, of a steam guard removably disposed over the open end, and manually controlled means for moving the guard over or away from the open end of the pipe, said guard consisting of an inverted cup-shaped member having an opening in its wall confined to one side of the latter, the top of the member being spaced above said pipe when said member is in operative position.

JOB FORDYCE MALSBARY.